(12) United States Patent
Ose et al.

(10) Patent No.: US 11,316,236 B2
(45) Date of Patent: Apr. 26, 2022

(54) METHOD FOR PRODUCING ELECTRODE FOR SOLID-STATE BATTERIES

(71) Applicant: TOYOTA JIDOSHA KABUSHIKI KAISHA, Toyota (JP)

(72) Inventors: Norihiro Ose, Sunto-gun (JP); Tomoya Suzuki, Seto (JP); Hajime Hasegawa, Susono (JP); Kazuo Yaso, Susono (JP); Hideaki Nishimura, Sunto-gun (JP); Yuki Matsushita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 460 days.

(21) Appl. No.: 16/519,386

(22) Filed: Jul. 23, 2019

(65) Prior Publication Data

US 2020/0035984 A1 Jan. 30, 2020

(30) Foreign Application Priority Data

Jul. 27, 2018 (JP) .............................. JP2018-141551

(51) Int. Cl.
*H01M 10/0562* (2010.01)
*H01M 4/139* (2010.01)
*H01M 50/581* (2021.01)
*H01M 4/04* (2006.01)
*H01M 10/0585* (2010.01)

(52) U.S. Cl.
CPC ......... *H01M 50/581* (2021.01); *H01M 4/043* (2013.01); *H01M 4/0404* (2013.01); *H01M 4/139* (2013.01); *H01M 10/0562* (2013.01); *H01M 10/0585* (2013.01); *H01M 2200/106* (2013.01)

(58) Field of Classification Search
CPC ....... H01M 10/0562; H01M 2200/106; H01M 4/139; H01G 9/15
See application file for complete search history.

(56) References Cited

U.S. PATENT DOCUMENTS

| | | |
|---|---|---|
| 2017/0207440 A1 | 7/2017 | Hama et al. |
| 2017/0207482 A1* | 7/2017 | Tomura ............. H01M 10/0525 |
| 2018/0006348 A1 | 1/2018 | Ebisuzaki et al. |
| 2018/0026301 A1* | 1/2018 | Ebisuzaki ......... H01M 10/0481 429/245 |
| 2019/0123355 A1 | 4/2019 | Ebisuzaki et al. |

FOREIGN PATENT DOCUMENTS

| | | |
|---|---|---|
| JP | 2017-130281 A | 7/2017 |
| JP | 2017-130283 A | 7/2017 |
| JP | 2018-010848 A | 1/2018 |
| JP | 2018-014286 A | 1/2018 |
| JP | 2019-079611 A | 5/2019 |

* cited by examiner

*Primary Examiner* — Tabassom Tadayyon Eslami
(74) *Attorney, Agent, or Firm* — Oliff PLC

(57) ABSTRACT

Provided is a method for producing an electrode for solid-state batteries which comprises a PTC resistor layer containing an insulating inorganic substance and in which electronic resistance is low. The production method is a method for producing an electrode for solid-state batteries, wherein the method is a method for producing an electrode for use in a solid-state battery comprising a cathode, an anode and an electrolyte layer disposed between the cathode and the anode; wherein the electrode is at least one of the cathode and the anode, and the electrode comprises a current collector, an electrode active material layer and a PTC resistor layer disposed between the current collector and the electrode active material layer.

7 Claims, 2 Drawing Sheets

METHOD FOR PRODUCING ELECTRODE
FOR SOLID-STATE BATTERIES

TECHNICAL FIELD

The disclosure relates to a method for producing an electrode for solid-state batteries.

BACKGROUND

In a battery used as an in-vehicle power source or as a power source for notebook PCs and portable devices, in the case of misuse such as an internal short circuit or overcharging, the temperature of the whole battery may increase and may have adverse effects on the battery itself or on a device using the battery.

As a measure to prevent such misuse, a technique of using an electrode has been attempted, the electrode comprising a positive temperature coefficient (PTC) resistor layer which has electron conductivity at normal temperature and which shows a rapid increase in electronic resistance value when the temperature of the battery is increased by the misuse.

Patent Literature 1 discloses an all-solid-state battery comprising: a cathode layer comprising a cathode active material layer and a cathode current collector; an anode layer comprising an anode active material layer and an anode current collector; and a solid electrolyte layer disposed between the cathode active material layer and the anode active material layer, wherein the all-solid-state battery further comprises a PTC film between the cathode current collector and the cathode active material layer and/or between the anode current collector and the anode active material layer, and the PTC film contains a conductive material and a resin.

Patent Literature 2 discloses an all-solid-state state battery comprising a laminate of a cathode active material layer, a solid electrolyte layer, and an anode active material layer in this order, and a restraining member that applies a restraining pressure to the laminate in a laminated direction, wherein a PTC layer containing a conductive material, an insulating inorganic substance and a polymer, is disposed at least at one of a position between the cathode active material layer and a cathode current collecting layer for collecting electrons of the cathode active material layer, and a position between the anode active material layer and an anode current collecting layer for collecting electrons of the anode active material layer, and the content of the insulating inorganic substance in the PTC layer is 50 volume % or more.

Patent Literature 1: Japanese Patent Application Laid-Open (JP-A) No. 2017-130283
Patent Literature 2: JP-A No. 2018-014286

The PTC resistor layer described in Patent Literature 1 does not contain an insulating inorganic substance. Compared to the PTC resistor layer, the electrode disclosed in Patent Literature 2, which comprises the PTC resistor layer containing the insulating inorganic substance, shows excellent PTC resistor function under pressure; however, it shows high electronic resistance at normal temperature.

SUMMARY

The disclosed embodiments were achieved in light of the above circumstance. An object of the disclosed embodiments is to provide a method for producing an electrode for solid-state batteries, which comprises a PTC resistor layer containing an insulating inorganic substance and in which electronic resistance at normal temperature is low.

In a first embodiment, there is provided a method for producing an electrode for solid-state batteries, wherein the method is a method for producing an electrode for use in a solid-state battery comprising a cathode, an anode and an electrolyte layer disposed between the cathode and the anode; wherein the electrode is at least one of the cathode and the anode, and the electrode comprises a current collector, an electrode active material layer and a PTC resistor layer disposed between the current collector and the electrode active material layer; wherein the method comprises: forming a first coating layer by applying a first slurry containing an electroconductive material, an insulating inorganic substance and a polymer to a first surface of the current collector and drying the applied first slurry, forming a second coating layer by applying a second slurry containing an electroconductive material and a polymer to a surface of the first coating layer and drying the applied second slurry, and laminating the electrode active material layer on the PTC resistor layer comprising the first and second coating layers formed on the current collector; and wherein a content ratio of the insulating inorganic substance in the second slurry is smaller than a content ratio of the insulating inorganic substance in the first slurry.

In the forming of the second coating layer, the current collector on which the first and second coating layers are formed, may be subjected to pressing.

In the forming of the second coating layer, a line pressure of the pressing may be from 5.6 kN/cm to 14.2 kN/cm.

In a second embodiment, there is provided a method for producing an electrode for solid-state batteries, wherein the method is a method for producing an electrode for use in a solid-state battery comprising a cathode, an anode and an electrolyte layer disposed between the cathode and the anode; wherein the electrode is at least one of the cathode and the anode, and the electrode comprises a current collector, an electrode active material layer and a PTC resistor layer disposed between the current collector and the electrode active material layer; wherein the method comprises: forming a first coating layer by applying a first slurry containing an electroconductive material, an insulating inorganic substance and a polymer to a first surface of the current collector and drying the applied first slurry, forming a second coating layer on the electrode active material layer by applying a second slurry containing an electroconductive material and a polymer to a first surface of a substrate, drying the applied second slurry to form the second coating layer, and then transferring the second coating layer from the substrate to the electrode active material layer, and producing the electrode for solid-state batteries comprising the current collector, the PTC resistor layer comprising the first and second coating layers, and the electrode active material layer, by laminating the current collector and the electrode active material layer so that the first coating layer of the current collector and the second coating layer of the electrode active material layer are in contact with each other; and wherein a content ratio of the insulating inorganic substance in the second slurry is smaller than a content ratio of the insulating inorganic substance in the first slurry.

In the disclosed embodiments, a thickness of the first coating layer may be larger than a thickness of the second coating layer.

In the disclosed embodiments, the insulating inorganic substance may be a metal oxide.

In the disclosed embodiments, the electroconductive material may be carbon black.

According to the disclosed embodiments, the method for producing the electrode for solid-state batteries which comprises a PTC resistor layer containing an insulating inorganic substance and in which electronic resistance at normal temperature is low, can be provided.

BRIEF DESCRIPTION OF THE DRAWINGS

In the accompanying drawings.

DETAILED DESCRIPTION

Figure 1:
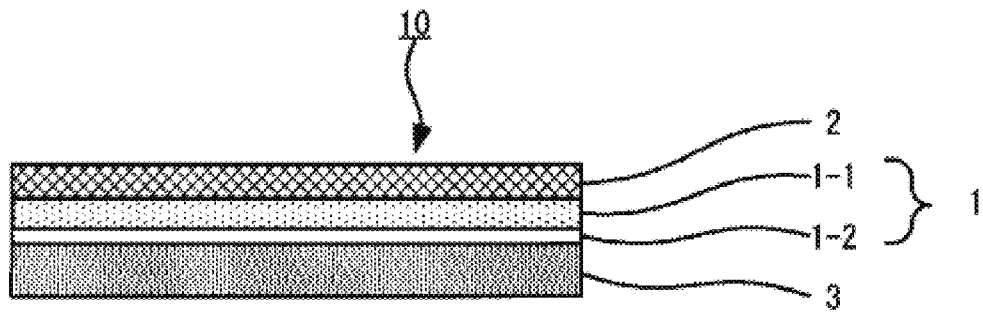
FIG. 1 is a schematic view of an electrode for solid-state batteries obtained by the production method of the disclosed embodiments.

The method for producing the electrode for solid-state batteries according to the first embodiment, is a method for producing an electrode for solid-state batteries, wherein the method is a method for producing an electrode for use in a solid-state battery comprising a cathode, an anode and an electrolyte layer disposed between the cathode and the anode; wherein the electrode is at least one of the cathode and the anode, and the electrode comprises a current collector, an electrode active material layer and a PTC resistor layer disposed between the current collector and the electrode active material layer; wherein the method comprises: forming a first coating layer by applying a first slurry containing an electroconductive material, an insulating inorganic substance and a polymer to a first surface of the current collector and drying the applied first slurry, forming a second coating layer by applying a second slurry containing an electroconductive material and a polymer to a surface of the first coating layer and drying the applied second slurry, and laminating the electrode active material layer on the PTC resistor layer comprising the first and second coating layers formed on the current collector; and wherein a content ratio of the insulating inorganic substance in the second slurry is smaller than a content ratio of the insulating inorganic substance in the first slurry.

The method for producing the electrode for solid-state batteries according to the second embodiment, is a method for producing an electrode for solid-state batteries, wherein the method is a method for producing an electrode for use in a solid-state battery comprising a cathode, an anode and an electrolyte layer disposed between the cathode and the anode; wherein the electrode is at least one of the cathode and the anode, and the electrode comprises a current collector, an electrode active material layer and a PTC resistor layer disposed between the current collector and the electrode active material layer; wherein the method comprises: forming a first coating layer by applying a first slurry containing an electroconductive material, an insulating inorganic substance and a polymer to a first surface of the current collector and drying the applied first slurry, forming a second coating layer on the electrode active material layer by applying a second slurry containing an electroconductive material and a polymer to a first surface of a substrate, drying the applied second slurry to form the second coating layer, and then transferring the second coating layer from the substrate to the electrode active material layer, and producing the electrode for solid-state batteries comprising the current collector, the PTC resistor layer comprising the first and second coating layers, and the electrode active material layer, by laminating the current collector and the electrode active material layer so that the first coating layer of the current collector and the second coating layer of the electrode active material layer are in contact with each other; and wherein a content ratio of the insulating inorganic substance in the second slurry is smaller than a content ratio of the insulating inorganic substance in the first slurry.

As described above, for the coating layer containing the polymer and the electroconductive material, it is known that when the temperature of the layer exceeds the melting point of the polymer by heating, the layer shows a PTC resistor function (a rapid increase in electronic resistance). This is because, due to the expansion of the polymer, the particles of the electroconductive material, which are in contact with each other, are separated and result in blocking of electron transfer.

In the current collector coated with the PTC resistor layer containing the polymer and the electroconductive material, when heat is generated in the battery due to overcharging or a short circuit, electron transfer from the electrode active material to the current collector is blocked, and an electrochemical reaction is arrested. Accordingly, further heat generation is suppressed and makes it possible to prevent adverse effects on the battery itself and on a device using the battery.

For the PTC resistor layer containing the polymer and the electroconductive material, the polymer is deformed and fluidized in such a misuse condition that a short circuit occurs while pressure is applied to the battery, whereby the PTC resistor layer cannot maintain its structure and may fail to exert the PTC resistor function. Accordingly, for the purpose of allowing the PTC resistor layer to maintain its layer structure even when pressure is applied to the battery, a technique as disclosed in Patent Literature 2 was proposed, in which an insulating inorganic substance is incorporated in the PTC resistor layer containing the polymer and the electroconductive material. It was thought that in the PTC resistor layer further containing the insulating inorganic substance, electronic resistance inside the PTC resistor layer is increased due to the effects of the insulating inorganic substance at normal temperature, thereby increasing electronic resistance in the whole electrode.

However, as a result of research, it was found that in the electrode comprising the PTC resistor layer containing the insulating inorganic substance, not only the electronic resistance inside the PTC resistor layer is high, but also electronic resistance at the interface between the PTC resistor layer and the electrode active material layer, is high. This seems to be because adhesion between the PTC resistor layer and the electrode active material layer at the interface therebetween, are decreased due to the presence of large amounts of the insulating inorganic substance on the surface of the PTC resistor layer.

In the production method of the disclosed embodiments, the second coating layer which contains the electroconductive material and the polymer and in which the content ratio of the insulating inorganic substance is smaller than the first coating layer, is formed between the electrode active material layer and the first coating layer containing the electroconductive material, the insulating inorganic substance and the polymer, whereby the electrode for solid-state batteries which comprises the PTC resistor layer containing the insulating inorganic substance and in which electronic resistance at normal temperature is low, can be obtained.

Hereinafter, the method for producing the electrode for solid-state batteries according to the disclosed embodiments, will be described in detail.

1. Electrode for Solid-State Batteries

The electrode obtained by the production method of the disclosed embodiments, is an electrode for use in a solid-state battery comprising a cathode, an anode and an electrolyte layer disposed between the cathode and the anode; the electrode is at least one of the cathode and the anode; and the electrode comprises a current collector, an electrode active material layer and a PTC resistor layer disposed between the current collector and the electrode active material layer.

An example of the basic structure of the solid-state battery will be described with reference to FIG. 4.

Figure 4:
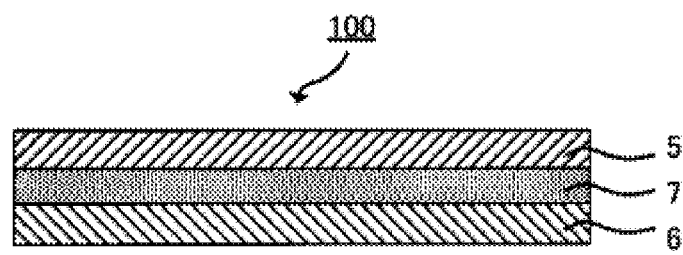
FIG. 4 is a schematic view of an example of the structure of a solid-state battery comprising the electrode obtained by the production method of the disclosed embodiments.

As shown in FIG. 4, a solid-state battery 100, in which the electrode obtained by the production method of the disclosed embodiments is used, comprises a cathode 5, an anode 6, and an electrolyte layer 7 disposed between the cathode 5 and the anode 6.

FIG. 4 is a schematic view of an example of the basic structure of the solid-state battery. The solid-state battery 100 may be a battery in a common form such as a coin form, a flat plate form and a cylindrical form.

In FIG. 4, the solid-state battery is schematically shown as a single cell. The solid-state battery may be an assembly of the single cells. As the cell assembly, examples include, but are not limited to, a cell stack composed of a stack of flat plate cells.

The solid-state battery comprises the electrolyte layer disposed between the cathode 5 and the anode 6. In the disclosed embodiments, the solid-state battery means a battery in which a solid electrolyte is used, and all the components of the solid-state battery are not needed to be solid. Accordingly, the electrolyte layer 7 is not particularly limited, as long as it can conduct transferred ions. As the electrolyte layer 7, examples include, but are not limited to, a polymer solid electrolyte-containing layer, an oxide solid electrolyte-containing layer, a sulfide solid electrolyte-containing layer, and a porous separator impregnated with an aqueous or non-aqueous electrolyte solution.

The electrode for solid-state batteries obtained by the production method of the disclosed embodiments, is at least one of the cathode and the anode, and the electrode comprises the current collector, the electrode active material layer and the PTC resistor layer disposed between the current collector and the electrode active material layer.

An example of the structure of the electrode for solid-state batteries obtained by the production method of the disclosed embodiments, will be described with reference to FIG. 1.

As shown in FIG. 1, an electrode 10 for solid-state batteries obtained by the production method of the disclosed embodiments, comprises a current collector 2, an electrode active material layer 3, and a PTC resistor layer 1 disposed between the current collector 2 and the electrode active material layer 3. At least one of the cathode 5 and the anode 6 shown in FIG. 4 corresponds to the electrode 10 for solid-state batteries shown in FIG. 1.

The material for the current collector 2 is not particularly limited, as long as it has electron conductivity. As the material for the current collector, examples include, but are not limited to, Al, Cu, Ni, Fe and SUS. When the electrode for solid-state batteries obtained by the production method of the disclosed embodiments, is the cathode, the material for the current collector may be Al. When the electrode for solid-state batteries is the anode, the material for the current collector may be Cu, Al or Ni.

The electrode active material layer 3 is not particularly limited, as long as it contains at least an electrode active material. As needed, it may contain a binder, an electroconductive material, and a solid electrolyte.

When the electrode for solid-state batteries obtained by the production method of the disclosed embodiments, is the cathode, the electrode active material is not particularly limited, as long as it is an electrode active material that is generally used as a cathode active material. For example, when the transferred ions are lithium ions, as the cathode active material, examples include, but are not limited to, a compound having a layered structure (such as $LiCoO_2$ and $LiNiO_2$), a compound having a spinel-type structure (such as $LiMn_2O_4$), and a compound having an olivine-type structure (such as $LiFePO_4$).

When the electrode for solid-state batteries obtained by the production method of the disclosed embodiments, is the anode, the electrode active material is not particularly limited, as long as it is an electrode active material that is generally used as an anode active material. For example, when the transferred ions are lithium ions, as the anode active material, examples include, but are not limited to, a carbonaceous material, a lithium alloy, an oxide and a nitride.

The binder is not particularly limited, as long as it is chemically and electrically stable. As the binder, examples include, but are not limited to, a fluorine-based binder such as polyvinylidene fluoride (PVDF) and polytetrafluoroethylene (PTFE).

The electroconductive material is not particularly limited, as long as it has electroconductivity. As the electroconductive material, examples include, but are not limited to, carbonaceous materials such as carbon black, activated carbon, carbon fiber (e.g., carbon nanotube, carbon nanofiber) and graphite.

The material for the solid electrolyte is not particularly limited, as long as it has ion conductivity. As the material, examples include, but are not limited to, inorganic materials such as a sulfide material and an oxide material. As the sulfide material, examples include, but are not limited to, $Li_2S$—$SiS_2$, $LiI$—$Li_2S$—$SiS_2$, $LiI$—$Li_2S$—$P_2S_5$, $Li_2S$—$P_2S_5$—$LiI$—$LiBr$, $LiI$—$Li_2OLi_2S$—$P_2S_5$, $LiI$—$Li_2S$—$P_2O_5$, $LiI$—$Li_3PO_4$—$P_2S_5$, $Li_2S$—$P_2S_5$, $Li_3PS_4$ and $Li_{10}GeP_2S_{12}$.

The PTC resistor layer 1 has a layered structure in which a first coating layer 1-1 and a second coating layer 1-2 are stacked so that the first coating layer 1-1 is disposed on a surface of the current collector 2 and the second coating layer 1-2 is disposed on a surface of the electrode active material layer 3.

Since the first coating layer 1-1 contains the electroconductive material, the insulating inorganic substance and the polymer, the PTC resistor layer 1 can maintain its structure and exert the PTC resistor function even when overheating is caused or pressure is applied in the misuse. In addition, since the second coating layer 1-2 contains the electroconductive material and the polymer and the content ratio of the insulating inorganic substance is smaller than the first coating layer 1-1, it is presumed that adhesion between the second coating layer 1-2 and the electrode active material layer 3 is increased and results in reduction of electronic resistance at the interface between the PTC resistor layer 1 and the electrode active material layer 3 at normal temperature.

The thickness of the PTC resistor layer 1 obtained by the production method of the disclosed embodiments, is not particularly limited. It may be from about 1 μm to about 30 μm.

The electrode obtained by the production method of the disclosed embodiments, is highly effective in the high pressure applied condition as described above. Accordingly, it is especially suitable for a solid-state battery to which pressure is applied in the laminating direction by a confining member, etc.

Hereinafter, the production process of the first embodiment and that of the second embodiment will be described in order.

2. First Embodiment

2-1. Forming the First Coating Layer

This is a step of forming the first coating layer by applying the first slurry containing the electroconductive material, the insulating inorganic substance and the polymer to the first surface of the current collector and drying the applied first slurry.

(1) First Slurry

The first slurry contains the electroconductive material, the insulating inorganic substance and the polymer.

The method for forming the first coating layer by applying the first slurry to the current collector and drying the applied first slurry, is not particularly limited. In general, the electroconductive material, the insulating inorganic substance and the polymer are dispersed in a non-aqueous solvent; the resulting dispersion is casted on the current collector; and the casted dispersion is dried. To uniformly coat the current collector with the first coating layer, the solid content concentration of the dispersion containing the electroconductive material, the insulating inorganic substance and the polymer may be about 24 mass %.

The thickness of the first coating layer is not particularly limited. The thickness may be from about 1 μm to about 10 μm.

(2) Electroconductive Material

The electroconductive material contained in the first slurry is not particularly limited, as long as it has electroconductivity. As the electroconductive material, examples include, but are not limited to, carbonaceous materials such as carbon black, activated carbon, carbon fiber (e.g., carbon nanotube, carbon nanofiber) and graphite. The electroconductive material may be carbon black. In general, the electroconductive material is in a particulate form. The electroconductive material may be primary particles or secondary particles.

The content of the electroconductive material in the first slurry is not particularly limited. When the total volume of the electroconductive material, the insulating inorganic substance and the polymer is determined as 100 volume %, the content of the electroconductive material may be 7 volume % or more, or it may be 10 volume % or more.

When the total volume of the contents of the electroconductive material and the polymer in the first slurry is determined as 100 volume %, the ratio of the content of the electroconductive material may be 10 volume % or more, or it may be 50 volume % or more, for example. Also when the total volume of the contents of the electroconductive material and the polymer in the first slurry is determined as 100 volume %, the ratio of the content of the electroconductive material may be 30 volume % or less, or it may be 20 volume % or less, for example.

(3) Insulating Inorganic Substance

The insulating inorganic substance contained in the first slurry functions to suppress deformation and fluidization of the PTC resistor layer in the thus-obtained electrode, both of which are due to heating and pressure, in the misuse. In general, the insulating inorganic substance is in a particulate form. The insulating inorganic substance may be primary particles or secondary particles.

The average particle diameter ($D_{50}$) of the insulating inorganic substance may be from 0.2 μm to 5 μm, or it may be from 0.4 μm to 2 μm. The average particle diameter ($D_{50}$) means a particle diameter at which, when the diameters of the particles are measured and arranged in ascending order, the accumulated volume of the particles is half (50%) the total volume of the particles. The average particle diameter ($D_{50}$) can be measured by use of a laser diffraction/scattering particle size distribution analyzer, for example. The particle size distribution of the insulating inorganic substance particles is not particularly limited. The particle size distribution of the particles may be a normal distribution when it is represented by a frequency distribution.

The insulating inorganic substance is not particularly limited, as long as it is a material that has a higher melting point than the below-described polymer. As the insulating inorganic substance, examples include, but are not limited to, a metal oxide and a metal nitride. As the metal oxide, examples include, but are not limited to, alumina, zirconia and silica. As the metal nitride, examples include, but are not limited to, a silicon nitride. Also, as the insulating inorganic substance, examples include, but are not limited to, a ceramic material. The insulating inorganic substance may be a metal oxide.

The content of the insulating inorganic substance in the first slurry is not particularly limited. When the total volume of the electroconductive material, the insulating inorganic substance and the polymer is determined as 100 volume %, the content of the insulating inorganic substance may be 30 volume % or more, or it may be 60 volume % or more.

When the content of the insulating inorganic substance is too small, it may be difficult to sufficiently suppress the deformation and fluidization of the thus-obtained PTC resistor layer, both of which are due to heating and pressure. On the other hand, when the content of the insulating inorganic substance is too large, the content of the polymer is relatively small. As a result, increasing the distance between the electroconductive material particles by the volume-expanded polymer is not possible, and an increase in electronic resistance may be insufficient. Also, electroconductive paths, which are formed by the electroconductive material, may be blocked by the insulating inorganic substance, and the electron conductivity of the PTC resistor layer during normal use may decrease.

When the total volume of the contents of the insulating inorganic substance and the polymer in the first slurry is determined as 100 volume %, the ratio of the content of the insulating inorganic substance may be 42 volume % or more, or it may be 66 volume % or more. Also when the total volume of the contents of the insulating inorganic substance and the polymer in the first slurry is determined as 100 volume %, the ratio of the content of the insulating inorganic substance may be 89 volume % or less, or it may be 66 volume % or less, for example.

(4) Polymer

The polymer contained in the first slurry is not particularly limited, as long as it is a polymer that expands when its temperature exceeds its melting point by heating. As the polymer, examples include, but are not limited to, thermoplastic resins such as polypropylene, polyethylene, polyvinyl chloride, polyvinylidene fluoride (PVDF), polystyrene, ABS resin, methacryl resin, polyamide, polyester, polycarbonate and polyacetal. These polymers may be used alone or in combination of two or more kinds.

From the viewpoint of melting point and ease of processing, the polymer may be polyvinylidene fluoride or polyethylene. The polymer may be polyvinylidene fluoride.

The content of the polymer in the first slurry is not particularly limited. When the total volume of the electroconductive material, the insulating inorganic substance and the polymer is determined as 100 volume %, the content of the polymer in the first slurry may be 8 volume % or more, or it may be 30 volume % or more. Also, the content of the polymer in the first slurry may be 60 volume % or less, or it may be 50 volume % or less.

(5) Non-Aqueous Solvent

The first slurry may contain a non-aqueous solvent for dissolving/dispersing the above-mentioned components. The type of the non-aqueous solvent is not particularly limited. As the non-aqueous solvent, examples include, but are not limited to, N-methylpyrrolidone, acetone, methyl ethyl ketone and dimethylacetamide. From the viewpoint of safety such as high flash point, small influence on human body and so on, the non-aqueous solvent may be N-methylpyrrolidone.

The content of the non-aqueous solvent in the first slurry is not particularly limited. When the total volume of the electroconductive material, the insulating inorganic substance and the polymer is determined as 100 volume %, the content of the non-aqueous solvent in the first slurry may be 81 volume % or more, or it may be 82 volume % or more. Also, the content of the non-aqueous solvent in the first slurry may be 93 volume % or less, or it may be 91 volume % or less.

2-2. Forming the Second Coating Layer

This is a step of forming the second coating layer by applying the second slurry which contains the electroconductive material and the polymer and which does not contain an insulating inorganic substance, to the surface of the first coating layer and drying the applied second slurry.

(1) Second Slurry

The second slurry contains the electroconductive material and the polymer, and the content ratio of the insulating inorganic substance in the second slurry is smaller than the content ratio of the insulating inorganic substance in the first slurry. Since the content ratio of the insulating inorganic substance in the second coating layer formed from the second slurry, is smaller than the first coating layer, adhesion between the PTC resistor layer (the second coating layer) and the electrode active material layer can be increased.

The method for forming the second coating layer by applying the second slurry to the surface of the first coating layer and drying the applied second slurry, is not particularly limited. In general, at least the electroconductive material and the polymer are dispersed in a non-aqueous solvent; the resulting dispersion is casted on the current collector; and the casted dispersion is dried. To uniformly coat the current collector with the second coating layer, the solid content concentration of the dispersion containing the electroconductive material and the polymer may be about 11 mass %.

The ratio of the electroconductive material to the polymer in the second slurry is not particularly limited. When the total volume of the contents of the electroconductive material and the polymer in the second slurry is determined as 100 volume %, the ratio of the content of the electroconductive material may be 10 volume % or more, or it may be 85 volume % or more, for example. Also when the total volume of the contents of the electroconductive material and the polymer in the second slurry is determined as 100 volume %, the ratio of the content of the electroconductive material may be 30 volume % or less, or it may be 20 volume % or less, for example.

The content ratio of the insulating inorganic substance in the second slurry is not particularly limited, as long as it is smaller than the content ratio of the insulating inorganic substance in the first slurry. When the total volume of the electroconductive material, the insulating inorganic substance and the polymer is determined as 100 volume %, the content ratio of the insulating inorganic substance in the second slurry may be less than 30 volume %; it may be 20 volume % or less; or it may be zero. This is because, even if the content of the insulating inorganic substance in the second coating layer is small, it is possible to sufficiently suppress the deformation and fluidization of the PTC resistor layer obtained from the first coating layer, both of which are due to heating and pressure. On the other hand, when the content of the insulating inorganic substance is too large, the adhesion between the PTC resistor layer and the electrode active material layer at the interface therebetween, are decreased due to the presence of large amounts of the insulating inorganic substance on the surface of the PTC resistor layer.

When the total volume of the contents of the insulating inorganic substance and the polymer in the second slurry is determined as 100 volume %, the ratio of the content of the insulating inorganic substance may be less than 42 volume %; it may be 20 volume % or less; or it may be zero.

The thickness of the second coating layer is not particularly limited. The thickness of the second coating layer may be from about 2 μm to about 6 μm, or it may be from 1 μm to 3 μm.

The production method of the disclosed embodiments may include pressing the current collector on which the first and second coating layers are formed.

When the applied pressing pressure is too high, the PTC resistor layer may be cracked. Accordingly, for example, in the case of roll pressing, the pressing pressure may be a line pressure of from 5.6 kN/cm to 14.2 kN/cm.

(2) Electroconductive Material, Polymer and Non-Aqueous Solvent

The electroconductive material, the polymer and the non-aqueous solvent which are contained in the second slurry, are the same as those contained in the first slurry. Accordingly, they will not be described here.

2-3. Laminating the Electrode Active Material Layer

This is a step of laminating the electrode active material layer on the PTC resistor layer comprising the first and second coating layers formed on the current collector.

In the first embodiment of the production method of the disclosed embodiments, the electrode active material layer is laminated on the second coating layer of the PTC resistor layer, which contains the electroconductive material and the polymer and in which the content ratio of the insulating inorganic substance is smaller than the first coating layer. Accordingly, in the thus-obtained electrode for solid-state batteries, the adhesion between the electrode active material layer and the PTC resistor layer at the interface therebetween, is increased and makes it possible to reduce electronic resistance at normal temperature.

3. Second Embodiment

3-1. Forming the First Coating Layer

As with the first embodiment, this is a step of forming the first coating layer by applying the first slurry containing the electroconductive material, the insulating inorganic substance and the polymer to the first surface of the current collector and drying the applied first slurry. This step will not be described here, since it is the same as described above in "2. First embodiment".

3-2. Forming the Second Coating Layer

This is a step of forming the second coating layer on the electrode active material layer by applying the second slurry, which contains the electroconductive material and the polymer and in which the content ratio of the insulating inorganic substance is smaller than the content ratio of the insulating inorganic substance in the first slurry, to the first surface of the substrate, drying the applied second slurry to form the second coating layer, and then transferring the second coating layer from the substrate to the electrode active material layer.

The second embodiment differs from the first embodiment in the following respect: while the second coating layer is formed on the first coating layer (the current collector) in the first embodiment, the second coating layer is formed on the electrode active material layer in the second embodiment. Both the first and second embodiments can finally produce the same electrode for solid-state batteries.

Since the second coating layer is transferred from the substrate to the electrode active material layer, this step is more complicated compared to the first embodiment. However, this step is advantageous in that the first coating layer is not affected by the solvent used in the second slurry.

The second slurry will not be described here, since it is the same as described above in "2. First embodiment".

The substrate used to form the second coating layer is not particularly limited. For example, Al, SUS, Fe, Cu or the like may be used.

3-3. Producing the Electrode for Solid-State Batteries Comprising the Current Collector, the PTC Resistor Layer Comprising the First and Second Coating Layers, and the Electrode Active Material Layer This is a step of producing the electrode for solid-state batteries in which the PTC resistor layer comprising the first and second coating layers is disposed between the current collector and the electrode active material layer, by laminating the current collector and the electrode active material layer so that the first coating layer of the current collector and the second coating layer of the electrode active material layer are in contact with each other.

EXAMPLES

Hereinafter, the disclosed embodiments will be further clarified by the following examples. The disclosed embodiments are not limited to the following examples, however.

1. Evaluation of Electrodes for Solid-State Batteries

<Production of Samples for Electrode Electronic Resistance Evaluation>

Example 1

The following materials for a first slurry were prepared.
Electroconductive material: Furnace black (manufactured by: Tokai Carbon Co., Ltd., average primary particle diameter: 66 nm)
Insulating inorganic substance: Alumina (particle diameter $D_{90}$: 6 μm)
Polymer: PVDF (product name: KF POLYMER L #9130, manufactured by: Kureha Corporation)
Solvent: N-methylpyrrolidone The furnace black, the PVDF and the alumina were mixed at a volume ratio of 10:30:60 with the N-methylpyrrolidone, thereby producing the first slurry. Then, the first slurry was applied on an aluminum foil having a thickness of 15 μm. The applied first slurry was dried in a stationary drying oven at 100° C. for one hour, thereby forming a first coating layer.

The following materials for a second slurry were prepared.
Electroconductive material: Furnace black (manufactured by: Tokai Carbon Co., Ltd., average primary particle diameter: 66 nm)
Polymer: PVDF (product name: KF POLYMER L #9130, manufactured by: Kureha Corporation)
Solvent: N-methylpyrrolidone First, the furnace black and the PVDF were mixed at a volume ratio of 40:60 with the N-methylpyrrolidone, thereby preparing the second slurry. Then, the second slurry was applied onto the first coating layer, and the applied second slurry was dried in the stationary drying oven at 100° C. for one hour, thereby forming a second coating layer. As a result, a PTC resistor layer-current collector laminate was produced.

The above step was carried out twice to produce a total of two PTC resistor layer-current collector laminates.

The following materials were put in a polypropylene (PP) container to obtain a mixture.
Cathode active material: $LiNi_{1/3}Co_{1/3}Mn_{1/3}O_2$ particles (average particle diameter: 6 μm)
Solid electrolyte: $Li_2S$—$P_2S_5$-based glass ceramic particles containing LiI and LiBr (average particle diameter: 0.8 μm)
Binder: A 5 mass % solution of a PVDF-based binder in butyl butyrate
Electroconductive material: VGCF
Solvent: Heptane The mixture in the container was subjected to ultrasonication by use of an ultrasonic homogenizer (product name: UH-50, manufactured by: SMT Co., Ltd.) for 30 seconds. Next, the container was shaken by a shaking device (product name: 6778, manufactured by: Corning) for three minutes. Then, the mixture in the container was further subjected to ultrasonication by use of the ultrasonic homogenizer for 30 seconds, thereby preparing a paste for forming the cathode active material layer.

The paste for forming the cathode active material layer was applied on an aluminum foil by a doctor blade method. The applied slurry was dried, thereby forming the cathode active material layer on the aluminum foil.

The above step was carried out twice to produce a total of two cathode active material layers.

The two cathode active material layers were laminated so that one of the cathode active material layers was in contact with the aluminum foil of the other cathode active material layer. A laminate thus obtained was subjected to roll pressing under the conditions of a line pressure of 10 kN/cm and room temperature.

After the roll pressing, the aluminum foil disposed outside the laminate was peeled off from the laminate so that the laminate obtained the following layer structure: cathode active material layer-aluminum foil-cathode active material layer. The cathode active material layer-aluminum foil-cathode active material layer laminate was subjected to roll pressing under the conditions of a line pressure of 50 kN/cm and 165° C.

Figure 2:
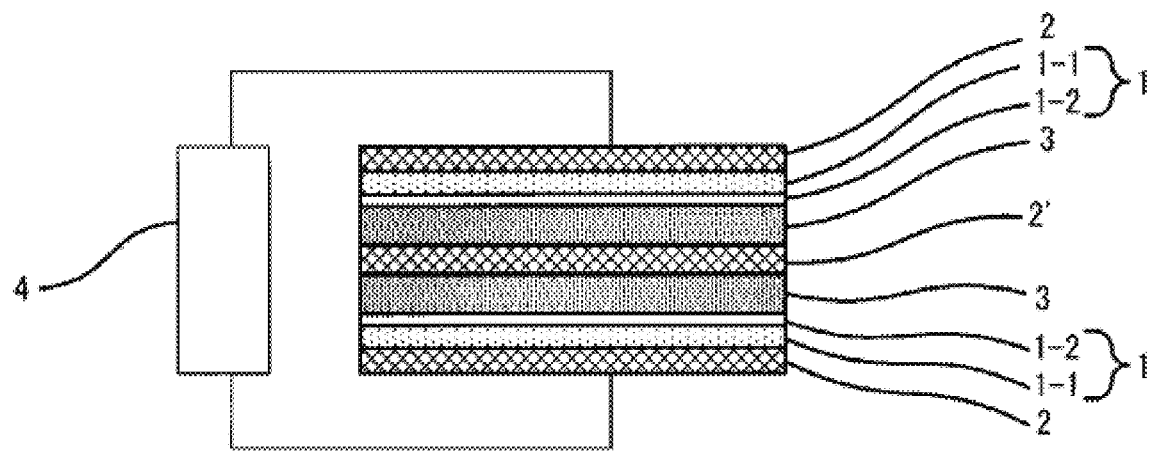
FIG. 2 is a schematic view of the structure of a sample for electrode electronic resistance measurement used in "Examples"

The PTC resistor layer-current collector laminates were attached to both sides of the cathode active material layer-aluminum foil-cathode active material layer laminate so that the cathode active material layers were in contact with the PTC resistor layers, thereby obtaining a sample for electrode electronic resistance evaluation as shown in FIG. 2.

Example 2

The sample for electrode electronic resistance evaluation of Example 2 was produced in the same manner as Example 1, except that the furnace black and the PVDF were mixed at a volume ratio of 85:15 with the N-methylpyrrolidone, thereby producing the second slurry.

Example 3

The sample for electrode electronic resistance evaluation of Example 3 was produced in the same manner as Example 1, except that the furnace black and the PVDF were mixed at a volume ratio of 20:80 with the N-methylpyrrolidone, thereby producing the second slurry.

Example 4

The sample for electrode electronic resistance evaluation of Example 4 was produced in the same manner as Example 3, except that the PTC resistor layer-current collector laminates were subjected to roll pressing under the conditions of a line pressure of 5.6 kN/cm and room temperature.

Example 5

The sample for electrode electronic resistance evaluation of Example 5 was produced in the same manner as Example 3, except that the PTC resistor layer-current collector laminates were subjected to roll pressing under the conditions of a line pressure of 14.2 kN/cm and room temperature.

Example 6

The following materials for a first slurry were prepared.
Electroconductive material: Furnace black (manufactured by: Tokai Carbon Co., Ltd., average primary particle diameter: 66 nm)
Insulating inorganic substance: Alumina (particle diameter $D_{90}$: 6 μm)
Polymer: PVDF (product name: KF POLYMER L #9130, manufactured by: Kureha Corporation)
Solvent: N-methylpyrrolidone The furnace black, the PVDF and the alumina were mixed at a volume ratio of 10:30:60 with the N-methylpyrrolidone, thereby producing the first slurry. Then, the first slurry was applied on an aluminum foil having a thickness of 15 μm. The applied first slurry was dried in the stationary drying oven at 100° C. for one hour, thereby forming a first coating layer. As a result, a first coating layer-current collector laminate was produced. This step was carried out twice to produce a total of two first coating layer-current collector laminates.

The following materials for a second slurry were prepared.

Electroconductive material: Furnace black (manufactured by: Tokai Carbon Co., Ltd., average primary particle diameter: 66 nm)
Polymer: PVDF (product name: KF POLYMER L #9130, manufactured by: Kureha Corporation)
Solvent: N-methylpyrrolidone First, the furnace black and the PVDF were mixed at a volume ratio of 85:15 with the N-methylpyrrolidone, thereby preparing the second slurry. Then, the second slurry is applied onto the aluminum foil, and the applied second slurry was dried in the stationary drying oven at 100° C. for one hour, thereby forming a second coating layer. As a result, a second coating layer-current collector laminate was produced. This step was carried out twice to produce a total of two second coating layer-current collector laminates.

The following materials were put in a PP container to obtain a mixture.
Cathode active material: $LiNi_{1/3}Co_{1/3}Mn_{1/3}O_2$ particles (average particle diameter: 6 μm)
Solid electrolyte: $Li_2S$—$P_2S_5$-based glass ceramic particles containing LiI and LiBr (average particle diameter: 0.8 μm)
Binder: A 5 mass % solution of a PVDF-based binder in butyl butyrate
Electroconductive material: VGCF
Solvent: Heptane The mixture in the container was subjected to ultrasonication by use of an ultrasonic homogenizer (product name: UH-50, manufactured by: SMT Co., Ltd.) for 30 seconds. Next, the container was shaken by a shaking device (product name: 6778, manufactured by: Corning) for three minutes. Then, the mixture in the container was further subjected to ultrasonication by use of the ultrasonic homogenizer for 30 seconds, thereby preparing a paste for forming the cathode active material layer.

The paste for forming the cathode active material layer was applied on an aluminum foil by the doctor blade method. The applied slurry was dried, thereby forming the cathode active material layer on the aluminum foil. This step was carried out twice to produce a total of two cathode active material layers.

The two cathode active material layers were laminated so that one of the cathode active material layers was in contact with the aluminum foil of the other cathode active material layer. A laminate thus obtained was subjected to roll pressing under the conditions of a line pressure of 10 kN/cm and room temperature.

After the roll pressing, the aluminum foil disposed outside the laminate was peeled off from the laminate so that the laminate obtained the following layer structure: cathode active material layer-aluminum foil-cathode active material layer. The cathode active material layer-aluminum foil-cathode active material layer laminate was subjected to roll pressing under the conditions of a line pressure of 50 kN/cm and 165° C.

The second coating layers were laminated on both sides of the cathode active material layer-aluminum foil-cathode active material layer laminate, and the aluminum foils of the second coating layers were peeled off. The first coating layer-current collector laminates were attached to both sides of the second coating layer-cathode active material layer-aluminum foil-cathode active material layer-second coating layer laminate so that the second coating layers were in contact with the first coating layers, thereby obtaining a sample for electrode electronic resistance evaluation as shown in FIG. 2.

Comparative Example 1

The sample for electrode electronic resistance evaluation of Comparative Example 1 was produced in the same manner as Example 1, except that the second coating layer was not formed.

<Evaluation of Room-Temperature Resistance>

Figure 3:
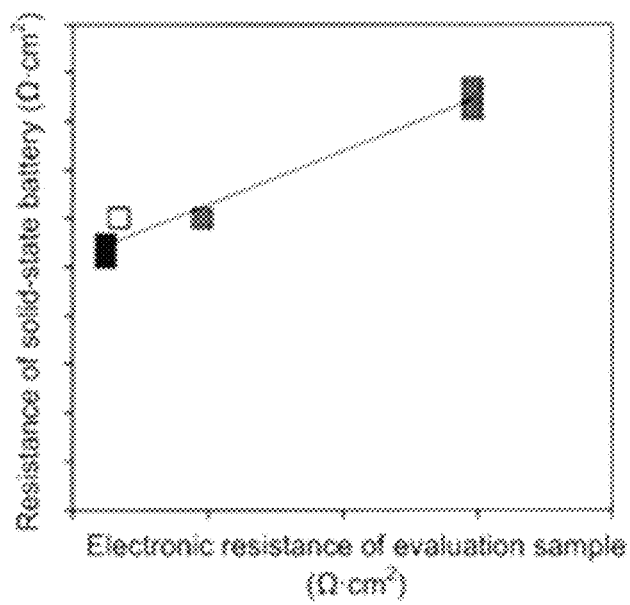
FIG. 3 is a view showing a relationship between the electronic resistance values of samples for electrode electronic resistance measurement and the resistance values of solid-state batteries comprising the electrodes.

The sample for electrode electronic resistance evaluation obtained in Example 1 was combined with a confining member, and a confining pressure of 10 MPa was applied to the sample by the confining member. While the sample was in this state, a constant current of 1 mA was passed between the current collectors at room temperature (25° C.). Voltage between terminals was measured, and an electronic resistance value was calculated. The electronic resistance values of Examples 2 to 6 and Comparative Example 1 were obtained in the same manner. A correlation as shown in FIG. 3 is found between the electronic resistance values obtained in this test and the resistances of solid-state batteries obtained by use of the electrodes used in this test.

2. Evaluation Results

Table 1 shows the properties of the first and second coating layers and relative electronic resistance. In Table 1, each number shown under "Relative electronic resistance (%)" means a relative electronic resistance at room temperature when the electronic resistance of Comparative Example 1 is determined as 100%.

Comparative Example 1 and Examples 1 to 6. Meanwhile, unlike the electrode for solid-state batteries of Comparative Example 1 in which the second coating layer was not contained, it is expected that the electronic resistance of the inside of the second coating layer is further added to the electrodes for solid-state batteries of Examples 1 to 6.

However, as shown in Table 1, the relative electronic resistances of the electrodes for solid-state batteries of Examples 1 to 6 are lower than the electrode for solid-state batteries of Comparative Example 1. It is presumed that this is because, since the second coating layer containing the electroconductive material and the polymer and not containing the insulating inorganic substance was present at the interface between the PTC resistor layer and the electrode active material layer, the adhesion between the second coating layer and the electrode active material layer at the interface therebetween, was increased, and the electronic resistance at the interface was decreased.

The first coating layer plays a main role in the PTC resistor function (e.g., an increase in electronic resistance at 250° C.). Accordingly, it is presumed that there is no difference in the PTC resistor function between Examples 1 to 6 and Comparative Example 1, all of which contained the same first coating layer.

As a result of comparing Examples 2 and 6, no large difference in electronic resistance was found between the first embodiment (in which the second coating layer is formed on the first coating layer) and the second embodi-

TABLE 1

| | Composition of the first coating layer $C/PVDF/A_{l2}O_3$ (Volume ratio) | Thickness (μm) of the first coating layer | Composition of the second coating layer C/PVDF (Volume ratio) | Thickness (μm) of the second coating layer | Amount (volume %) of C in the second coating layer | Roll pressing pressure (kN/cm) to the current collector comprising the PCT resistor layer | Relative electronic resistance (%) | Embodiment |
|---|---|---|---|---|---|---|---|---|
| Comparative Example 1 | 10/30/60 | 10 | — | — | — | — | 100 | — |
| Example 1 | 10/30/60 | 8 | 40/60 | 3 | 40 | 0 | 17 | First embodiment |
| Example 2 | 10/30/60 | 8 | 85/15 | 3 | 85 | 0 | 13 | First embodiment |
| Example 3 | 10/30/60 | 8 | 20/80 | 2 | 20 | 0 | 13 | First embodiment |
| Example 4 | 10/30/60 | 8 | 20/80 | 2 | 20 | 5.6 | 11 | First embodiment |
| Example 5 | 10/30/60 | 8 | 20/80 | 2 | 20 | 14.2 | 10 | First embodiment |
| Example 6 | 10/30/60 | 8 | 85/15 | 6 | 85 | 0 | 16 | Second embodiment |

As shown in Table 1, when the electronic resistance of the electrode for solid-state batteries comprising the PTC resistor layer of Comparative Example 1, which was produced by forming only the first coating layer by use of the first slurry containing the electroconductive material, the insulating inorganic substance and the polymer, is determined as 100%, the relative electronic resistances of the electrodes for solid-state batteries comprising the PTC resistor layers of Examples 1 to 6, each of which was produced by forming the first coating layer by use of the first slurry containing the electroconductive material, the insulating inorganic substance and the polymer and forming the second coating layer by use of the second slurry containing the electroconductive material and the polymer and not containing the insulating inorganic substance, were as low as from 10% to 17% each.

It is presumed that there is no difference in the electronic resistance of the inside of the first coating layer between ment (in which the second coating layer is formed on the electrode active material layer).

As a result of comparing Examples 3 to 5, it was revealed that the electronic resistance is further decreased by pressing the current collector-first coating layer-second coating layer laminate at a pressure of from 5.6 kN/cm to 14.2 kN/cm. It is presumed that this is because, in addition to an increase in adhesion between the current collector and the PTC resistor layer at the interface therebetween, the surface of the second coating layer is flattened and smoothed to increase the adhesion between the electrode active material layer and the PTC resistor layer at the interface therebetween.

From the above results, it was revealed that the electrode for solid-state batteries which comprises the PTC resistor layer containing the insulating inorganic substance and in which electronic resistance at normal temperature is low, is obtained by the production method of the disclosed embodiments, wherein the method comprises forming the first coating layer by applying the first slurry containing the electroconductive material, the insulating inorganic substance and the polymer and drying the applied first slurry, and forming the second coating layer by applying the second slurry containing the electroconductive material and the polymer and drying the applied second slurry, and wherein the content ratio of the insulating inorganic substance in the second slurry is smaller than the content ratio of the insulating inorganic substance in the first slurry.

REFERENCE SIGNS LIST

1. PTC resistor layer
1-1. First coating layer
1-2. Second coating layer
2. Current collector
2'. Metal foil composed of the same material as the current collector
3. Electrode active material layer
4. Resistance measuring device
5. Cathode
6. Anode
7. Electrolyte layer
10. Electrode for solid-state batteries
100. Solid-state battery

The invention claimed is:

1. A method for producing an electrode for solid-state batteries,
wherein the method is a method for producing an electrode for use in a solid-state battery comprising a cathode, an anode and an electrolyte layer disposed between the cathode and the anode;
wherein the electrode is at least one of the cathode and the anode, and the electrode comprises a current collector, an electrode active material layer and a PTC resistor layer disposed between the current collector and the electrode active material layer;
wherein the method comprises:
forming a first coating layer by applying a first slurry containing an electroconductive material, an insulating inorganic substance and a polymer to a first surface of the current collector and drying the applied first slurry,
forming a second coating layer by applying a second slurry containing an electroconductive material and a polymer to a surface of the first coating layer and drying the applied second slurry, and
laminating the electrode active material layer on the PTC resistor layer comprising the first and second coating layers formed on the current collector; and
wherein a content ratio of the insulating inorganic substance in the second slurry is smaller than a content ratio of the insulating inorganic substance in the first slurry.

2. The method for producing the electrode for solid-state batteries according to claim 1, wherein, in the forming of the second coating layer, the current collector on which the first and second coating layers are formed, is subjected to pressing.

3. The method for producing the electrode for solid-state batteries according to claim 2, wherein a line pressure of the pressing is from 5.6 kN/cm to 14.2 kN/cm.

4. The method for producing the electrode for solid-state batteries according to claim 1, wherein a thickness of the first coating layer is larger than a thickness of the second coating layer.

5. The method for producing the electrode for solid-state batteries according to claim 1, wherein the insulating inorganic substance is a metal oxide.

6. The method for producing the electrode for solid-state batteries according to claim 1, wherein the electroconductive material is carbon black.

7. A method for producing an electrode for solid-state batteries,
wherein the method is a method for producing an electrode for use in a solid-state battery comprising a cathode, an anode and an electrolyte layer disposed between the cathode and the anode;
wherein the electrode is at least one of the cathode and the anode, and the electrode comprises a current collector, an electrode active material layer and a PTC resistor layer disposed between the current collector and the electrode active material layer;
wherein the method comprises:
forming a first coating layer by applying a first slurry containing an electroconductive material, an insulating inorganic substance and a polymer to a first surface of the current collector and drying the applied first slurry,
forming a second coating layer on the electrode active material layer by applying a second slurry containing an electroconductive material and a polymer to a first surface of a substrate, drying the applied second slurry to form the second coating layer, and then transferring the second coating layer from the substrate to the electrode active material layer, and
producing the electrode for solid-state batteries comprising the current collector, the PTC resistor layer comprising the first and second coating layers, and the electrode active material layer, by laminating the current collector and the electrode active material layer so that the first coating layer of the current collector and the second coating layer of the electrode active material layer are in contact with each other; and
wherein a content ratio of the insulating inorganic substance in the second slurry is smaller than a content ratio of the insulating inorganic substance in the first slurry.

* * * * *